US012570165B2

(12) United States Patent
Fujimoto et al.

(10) Patent No.: US 12,570,165 B2
(45) Date of Patent: Mar. 10, 2026

(54) WIRELESS POWER RECEPTION SYSTEM, MOVING BODY, AND WHEEL

(71) Applicants: THE UNIVERSITY OF TOKYO, Tokyo (JP); BRIDGESTONE CORPORATION, Tokyo (JP); NSK Ltd., Tokyo (JP)

(72) Inventors: Hiroshi Fujimoto, Tokyo (JP); Osamu Shimizu, Tokyo (JP); Keizo Akutagawa, Tokyo (JP); Yasumichi Wakao, Tokyo (JP); Isao Kuwayama, Tokyo (JP); Daisuke Gunji, Fujisawa (JP)

(73) Assignees: THE UNIVERSITY OF TOKYO, Tokyo (JP); BRIDGESTONE CORPORATION, Tokyo (JP); NSK Ltd., Tokyo (JP)

( * ) Notice: Subject to any disclaimer, the term of this patent is extended or adjusted under 35 U.S.C. 154(b) by 914 days.

(21) Appl. No.: 17/754,673

(22) PCT Filed: Sep. 10, 2020

(86) PCT No.: PCT/JP2020/034379
§ 371 (c)(1),
(2) Date: Apr. 8, 2022

(87) PCT Pub. No.: WO2021/070556
PCT Pub. Date: Apr. 15, 2021

(65) Prior Publication Data
US 2023/0090157 A1      Mar. 23, 2023

(30) Foreign Application Priority Data

Oct. 9, 2019    (JP) ................................. 2019-186312

(51) Int. Cl.
*B60L 53/12* (2019.01)
*B60L 53/30* (2019.01)
(Continued)

(52) U.S. Cl.
CPC ............... *B60L 53/12* (2019.02); *B60L 53/30* (2019.02); *H02J 50/005* (2020.01); *H02J 50/10* (2016.02);
(Continued)

(58) Field of Classification Search
CPC ...... B60L 53/12; B60L 53/30; B60L 2220/44; B60L 2220/46; H02J 50/10; H02J 50/005
(Continued)

(56) References Cited

U.S. PATENT DOCUMENTS 8,240,406 B2    8/2012    Stoicoviciu et al.
8,499,910 B2    8/2013    Burkhard
(Continued)

FOREIGN PATENT DOCUMENTS

CN          102848928 A      1/2013
CN          104094498 A      10/2014
(Continued)

OTHER PUBLICATIONS

Oct. 24, 2023, search result of Office Action issued by the China National Intellectual Property Administration in the corresponding Chinese Patent Application No. 202080071129.5.
(Continued)

*Primary Examiner* — Suchin Parihar
(74) *Attorney, Agent, or Firm* — KENJA IP LAW PC

(57) ABSTRACT
A wireless power reception system 1 includes: a power reception device 5 including a power reception coil 51 that receives power supplied wirelessly from a power transmission coil 41 of a power transmission device 4 installed in a road surface, at least a portion of the power reception coil 51
(Continued)

being housed in a wheel 3 of a moving body 2; and an onboard device 6 which is installed in the moving body 2 and which is electrically connected to the power reception device 5, wherein the power reception device 5 can transmit received power to the onboard device 6, and the power reception coil 51 has a convex shape pointing downward in a side view as seen from an axial direction of the wheel 3.

10 Claims, 10 Drawing Sheets

(51) Int. Cl.
 *H02J 50/00* (2016.01)
 *H02J 50/10* (2016.01)
(52) U.S. Cl.
 CPC ....... *B60L 2220/44* (2013.01); *B60L 2220/46* (2013.01)
(58) Field of Classification Search
 USPC ......................................................... 320/108
 See application file for complete search history.

(56) References Cited

U.S. PATENT DOCUMENTS

| | | | | |
|---|---|---|---|---|
| 9,586,449 | B2 * | 3/2017 | Love | B60B 7/20 |
| 9,895,988 | B2 | 2/2018 | Koizumi et al. | |
| 10,059,213 | B2 | 8/2018 | Ricci | |
| 11,171,520 | B2 | 11/2021 | Kanno | |
| 2011/0031047 | A1 * | 2/2011 | Tarr | B60L 50/40 191/10 |
| 2011/0220446 | A1 * | 9/2011 | Hubner | B60L 53/126 191/10 |
| 2013/0214706 | A1 * | 8/2013 | Flomenhoft | H04B 5/79 307/104 |
| 2015/0266385 | A1 | 9/2015 | Lang | |
| 2018/0331601 | A1 * | 11/2018 | Zhou | H02K 9/06 |
| 2019/0084430 | A1 * | 3/2019 | Klinger | B60L 53/32 |
| 2020/0114766 | A1 * | 4/2020 | Javaid | B60L 53/38 |
| 2022/0266702 | A1 * | 8/2022 | Fujimoto | B60K 1/04 |
| 2022/0288974 | A1 | 9/2022 | Kuwayama | |
| 2022/0363092 | A1 * | 11/2022 | Copeland | B60B 19/00 |
| 2022/0416580 | A1 * | 12/2022 | Fujimoto | H02J 50/005 |
| 2023/0086747 | A1 * | 3/2023 | Fujimoto | H02J 50/10 |
| 2023/0088378 | A1 * | 3/2023 | Fujimoto | H02J 50/40 191/10 |

FOREIGN PATENT DOCUMENTS

| | | | |
|---|---|---|---|
| CN | 104333145 | A | 2/2015 |
| CN | 104736379 | A | 6/2015 |
| CN | 105291991 | A | 2/2016 |
| CN | 105337334 | A | 2/2016 |
| JP | H08126106 | A | 5/1996 |
| JP | 2010022183 | A | 1/2010 |
| JP | 2012509654 | A | 4/2012 |
| JP | 5164460 | B2 | 3/2013 |
| JP | 2014103706 | A | 6/2014 |
| JP | 2014195350 | A | 10/2014 |
| JP | 2015116068 | A | 6/2015 |
| JP | 2016502383 | A | 1/2016 |
| JP | 2016076605 | A | 5/2016 |
| JP | 2016134512 | A | 7/2016 |
| JP | 2018007524 | A | 1/2018 |
| JP | 2018068077 | A | 4/2018 |
| WO | 2021015255 | A1 | 1/2021 |

OTHER PUBLICATIONS

Apr. 12, 2022, International Preliminary Report on Patentability issued in the International Patent Application No. PCT/JP2020/034379.

Jun. 5, 2024, search result of Office Action issued by the China National Intellectual Property Administration in the corresponding Chinese Patent Application No. 202080071129.5.

Nov. 2, 2020, International Search Report issued in the International Patent Application No. PCT/JP2020/034379.

www.k.u-tokyo.ac.jp, Retrieved on Mar. 11, 2022, from URL: https://www.k.u-tokyo.ac.jp/info/entry/22_entry553/.

Sep. 28, 2023, search result of the Extended European Search Report issued by the European Patent Office in the corresponding European Patent Application No. 20873804.7.

Osamu Shimizu et al., Mutual Inductance Modeling of In-wheel Arc-shaped Coil for In-motion WPT, 2019 IEEE Wireless Power Transfer Conference (WPTC), 2019, pp. 624-628, XP033753519.

\* cited by examiner

*FIG. 6*

WIRELESS POWER RECEPTION SYSTEM, MOVING BODY, AND WHEEL

TECHNICAL FIELD

The present disclosure relates to a wireless power reception system, a moving body, and a wheel.

BACKGROUND

In the related art, a wireless power transfer technology is known in which a power transmission device provided in a road surface, such as a road or a parking lot, supplies power wirelessly to a power reception device installed in a vehicle. For example, PTL 1 discloses a vehicle provided with a power reception device on the underside of the vehicle, which enables the vehicle to receive power from a power transmission device provided in a road surface.

CITATION LIST

Patent Literature

PTL 1: Japanese Patent Laid-Open No. 2018-068077

SUMMARY

Technical Problem

However, in the wireless power transfer technology of the related art described above, if the power transmission device provided in a road surface such as a road and the power reception device installed in a vehicle that travels on the road are too far apart, an obstacle such as a small animal or piece of metal may come into the space between the power transmission device and the power reception device, eddy currents may be generated around the obstacle, and the power reception efficiency may be lowered. Moreover, the small animal, piece of metal, or the like that has come between the power transmission device and the power reception device may heat up and catch fire.

A purpose of the present disclosure devised in the light of such circumstances is to provide a wireless power reception system, a moving body, and a wheel that can improve the power reception efficiency in wireless power transfer.

Solution to Problem

A wireless power reception system according to the present disclosure includes:

a power reception device including a power reception coil that receives power supplied wirelessly from a power transmission coil of a power transmission device installed in a road surface, at least a portion of the power reception coil being housed in a wheel of a moving body; and an onboard device which is installed in the moving body and which is electrically connected to the power reception device, wherein the power reception device can transmit the received power to the onboard device, and the power reception coil has a convex shape pointing downward in a side view as seen from an axial direction of the wheel.

A moving body according to the present disclosure includes:

a wheel;

a power reception device including a power reception coil that receives power supplied wirelessly from a power transmission coil of a power transmission device installed in a road surface, at least a portion of the power reception coil being housed in the wheel; and an onboard device electrically connected to the power reception device, wherein the power reception device can transmit the received power to the onboard device, and the power reception coil has a convex shape pointing downward in a side view as seen from an axial direction of the wheel.

A wheel according to the present disclosure is a wheel of a moving body and includes:

a power reception device including a power reception coil that receives power supplied wirelessly from a power transmission coil of a power transmission device installed in a road surface, wherein at least a portion of the power reception coil is housed internally, and the power reception coil has a convex shape pointing downward in a side view as seen from an axial direction of the wheel.

Advantageous Effect

According to the present disclosure, it is possible to provide a wireless power reception system, a moving body, and a wheel that can improve the power reception efficiency in wireless power transfer.

BRIEF DESCRIPTION OF THE DRAWINGS

In the accompanying drawings:

FIG. 6 is a perspective view schematically illustrating the winding structure of a wire rod of the power reception coil in FIG. 2;

DETAILED DESCRIPTION

Figure 1:
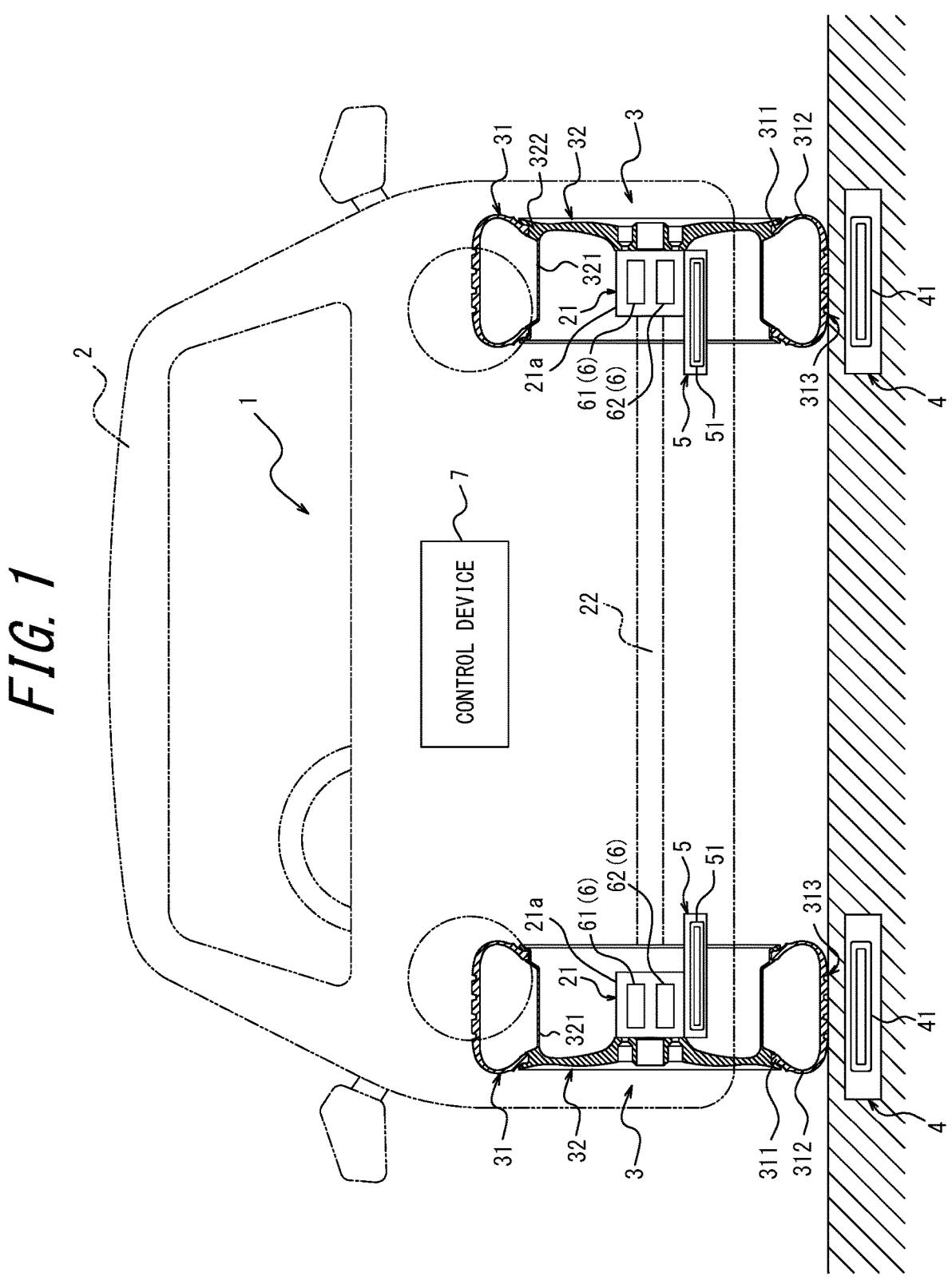
FIG. 1 is a schematic diagram that uses a lateral cross section of wheels to generally illustrate a wireless power reception system according to an embodiment of the present disclosure.

Hereinafter, a wireless power reception system, moving body, and wheel according to an embodiment of the present disclosure will be described with reference to the drawings. In the drawings, common components and parts are denoted with the same signs. In this specification, the lateral direction of a wheel refers to the direction parallel to the rotation axis of the wheel. The radial direction of a wheel refers to the direction orthogonal to the rotation axis of the wheel. (Configuration of Wireless Power Reception System)

FIG. 1 illustrates a schematic diagram that uses a lateral cross section of wheels to generally illustrate a wireless power reception system 1 according to an embodiment of the present disclosure. The wireless power reception system 1 is used so that a moving body 2 provided with a wheel 3 receives power from a power transmission device 4 installed in a road surface. The wireless power reception system 1 includes a power reception device 5 and an onboard device 6. The power reception device 5 is housed, at least in part, in the wheel 3 of the moving body 2, and receives power supplied wirelessly from a power transmission device 4 installed in a road surface. The onboard device 6 is installed in the moving body 2 and is electrically connected to the power reception device 5. When the moving body 2 travels or stops over the road surface in which the power transmission device 4 is installed, the power reception device 5 receives power wirelessly from the power transmission device 4. The power reception device 5 transmits the received power to the onboard device 6.

The wireless power reception system 1 may further include a control device 7. The control device 7 is communicably connected to the power reception device 5 and the onboard device 6 through an in-vehicle network such as a controller area network (CAN). The control device 7 can control the power reception device 5 and the onboard device 6 such that power received wirelessly by the power reception device 5 is transmitted to the onboard device 6. The positions and numbers of the wheel 3, power reception device 5, onboard device 6, and control device 7 in the moving body 2 illustrated in FIG. 1 are an example and may be determined freely to suit the purpose and the like of each device.

The moving body 2 can travel over a road surface such as a road via the wheel 3. The moving body 2 is an automobile for example, but is not limited thereto. The moving body 2 may be any vehicle capable of traveling over a road surface via the wheel 3, including an automobile such as a passenger vehicle, a truck, a bus, or a motorcycle, an agricultural vehicle such as a tractor, an industrial or construction vehicle such as a dump truck, an aircraft, a bicycle, or a wheelchair.

The wheel 3 is used to move the moving body 2. The wheel 3 has a contact patch that contacts the road surface such as a road while attached to the moving body 2. In the present embodiment, each wheel 3 is a tire and wheel assembly obtained by mounting a tire 31 onto a wheel 32, but the wheel 3 is not limited thereto and may be any wheel that can be attached to the moving body 2 described above. In the case where the wheel 3 is a tire and wheel assembly, the "contact patch" of the wheel 3 refers to the contact patch of the tire 31, or in other words, the surface of the tire 31 that touches the road surface in the state in which the tire 31 is mounted onto an applicable rim, inflated to a prescribed internal pressure, and subjected to a maximum load.

In this specification, an "applicable rim" refers to a valid industrial standard in the region where a pneumatic tire is manufactured and used, namely, an approved rim for an applicable size described in a publication such as the JATMA Year Book of the Japan Automobile Tyre Manufacturers Association (JATMA) in Japan, the Standards Manual of the European Tyre and Rim Technical Organization (ETRTO) in Europe, or the Year Book of the Tire and Rim Association, Inc. (TRA) in the United States or to be described in the future (the Measuring Rim in the ETRTO Standards Manual or the Design Rim in the TRA Year Book), but in the case of a size not described in the above industrial standards, the applicable rim refers to a rim of a width corresponding to the bead width of the pneumatic tire. The "applicable rim" includes current sizes in addition to sizes that may be included in the above industrial standards in the future. The "sizes to be described in the future" may include the sizes described as "Future Developments" in the ETRTO 2013 edition, for example.

In this specification, the "prescribed internal pressure" refers to the air pressure (maximum air pressure) corresponding to the maximum load capability of a single wheel for the applicable size and ply rating described in an industrial standard such as the JATMA Year Book described above, but in the case of a size not described in the above industrial standards, the prescribed internal pressure refers to the air pressure (maximum air pressure) corresponding to the maximum load capability prescribed for each vehicle on which the tires are mounted. Also, in this specification, the "maximum load" refers to the load corresponding to the maximum load capability for a tire of applicable size described in the above industrial standards, or in the case of a size not described in the above industrial standards, the load corresponding to the maximum load capability prescribed for each vehicle on which the tires are mounted.

FIG. 1 illustrates a schematic diagram that uses a lateral cross section of the wheels 3 to generally illustrate a tire and wheel assembly as one example of the wheel 3 in the wireless power reception system 1 according to an embodiment of the present disclosure.

As illustrated in FIG. 1, each tire 31 includes a pair of bead portions 311, a pair of sidewall portions 312, and a tread portion 313. The bead portions 311 are configured such that the inner radial side and outer lateral side touch a rim portion 321 of the wheel 32 when the tire 31 is mounted onto the rim portion 321. The sidewall portions 312 extend between the tread portion 313 and the bead portions 311. The sidewall portions 312 are positioned farther radially outward than the bead portions 311. The tread portion 313 is positioned farther radially outward than the sidewall portions 312, and may include the contact patch of the tire 31.

The tire 31 is formed using a rubber such as natural rubber or synthetic rubber, and may include parts such as a carcass, a belt, and bead wires formed using a metal such as steel. For example, at least a portion of the parts such as the carcass, belt, and bead wires may also be formed using a nonmagnetic material. With this configuration, the strength of the tire 31 can be maintained, while in addition, due to the existence of a metal between the power transmission device 4 and the power reception device 5, the tire 31 can lessen the attenuation of a magnetic field generated by the power transmission device 4 before the magnetic field reaches the power reception device 5, and by extension, improve the power reception efficiency of the power reception device 5 when wireless power transfer from the power transmission device 4 to the power reception device 5 is performed by electromagnetic induction, as described later. However, at least a portion of the parts such as the carcass, belt, and bead wires does not have to be formed using a nonmagnetic material.

The nonmagnetic material may include a paramagnetic material or a diamagnetic material having a low permeability. For example, a resin material containing a thermoplastic resin such as polyester or nylon, a thermosetting resin such as a vinyl ester resin or an unsaturated polyester resin, or some other synthetic resin can be used as the nonmagnetic material. Furthermore, fibers of a material such as glass, carbon, graphite, aramid, polyethylene, or ceramic can be included in the resin material as reinforcing fibers. The nonmagnetic material is not limited to a resin, and any nonmetallic material containing rubber, glass, carbon, graphite, aramid, polyethylene, ceramic, or the like can be used. Furthermore, a metal material containing a paramagnetic material such as aluminum or a diamagnetic material such as copper can be used as the nonmagnetic material.

The wheel 32 includes a cylindrical rim portion 321 for mounting the tire 31 and a disc portion 322 which is provided on the inner radial side of the rim portion 321 and which is supported by and secured to a hub 21 of the moving body 2.

The wheel 32 may be formed using a metal such as steel, but is not limited thereto. At least a portion of the rim portion 321 of the wheel 32 may also be formed using the nonmagnetic material described above. With this configuration, the strength of the wheel 32 can be maintained, while in addition, due to the existence of a metal such as steel between the power transmission device 4 and the power reception device 5, the wheel 32 can lessen the attenuation of a magnetic field generated by the power transmission device 4 before the magnetic field reaches the power reception device 5, and by extension, improve the power reception efficiency of the power reception device 5. However, at least a portion of the rim portion 321 of the wheel 32 does not have to be formed using a nonmagnetic material.

Referring to FIG. 1, the power transmission device 4 is provided with a power transmission coil (primary coil) 41. The power transmission device 4 is installed in a road surface such as a road or a parking lot. In the present embodiment, the power transmission device 4 is embedded in a road or the like, but may also be installed such that at least a portion is exposed on the road surface. In the diagram, the power transmission coil 41 is illustrated schematically for simplicity.

The power transmission coil 41 generates an AC magnetic field on the basis of an AC current supplied from a power source. In the present embodiment, the power transmission coil 41 is configured into a loop overall. In this specification, the plane enclosed by the looped power transmission coil 41 is also referred to as the coil plane of the power transmission coil 41. To generate an AC magnetic field directed above the road surface, the power transmission coil 41 is disposed such that the coil plane of the power transmission coil 41 is approximately parallel to the road surface (in other words, the axial direction of the power transmission coil 41 is approximately perpendicular to the road surface). The power transmission coil 41 provided in the power transmission device 4 is wound around a core such as a ferrite core and configured into a loop overall, for example, but is not limited thereto, and may be any type of coil that can generate an AC magnetic field, such as a coil spring or an air core coil. With this configuration, when the wheel 3 passes over the power transmission device 4 while the moving body 2 is traveling or the like, wireless power transfer from the power transmission coil 41 to a power reception coil 51 may be performed by electromagnetic induction.

The power reception device 5 is provided with a power reception coil (secondary coil) 51. The power reception coil 51 receives power supplied wirelessly from the power transmission coil 41 of the power transmission device 4. In the present embodiment, the power reception coil 51 is configured into a loop overall. In this specification, the plane enclosed by the looped power reception coil 51 is also referred to as the coil plane of the power reception coil 51. The power reception coil 51 is disposed such that the coil plane of the power reception coil 51 is approximately parallel to the contact patch of the wheel 3 (in other words, the axial direction of the power reception coil 51 is approximately perpendicular to the road surface). With this arrangement, an electromotive force is generated by electromagnetic induction and a current flows in the power reception coil 51 on the basis of the AC magnetic field generated by the power transmission coil 41. In the diagram, the power reception coil 51 is illustrated schematically for simplicity.

At least a portion of the power reception coil 51 is housed in the wheel 3 of the moving body 2. In the present embodiment, at least a portion (preferably all) of the coil plane of the power reception coil 51 faces the contact patch of the wheel 3. With this arrangement, in the case where the contact patch of the wheel 3 is positioned above the power transmission coil 41, including the case where the coil plane of the power reception coil 51 does not extend approximately parallel to the contact patch of the wheel 3, at least a portion of the coil plane of the power reception coil 51 can face at least a portion of the coil plane of the power transmission coil 41 with the contact patch of the wheel 3 in between. Consequently, the possibility of an obstacle coming between the power transmission coil 41 and the power reception coil 51 may be lowered, and additionally, the magnetic field lines emitted from the power transmission coil 41 can be received appropriately by the power reception coil 51. Consequently, the power reception efficiency in wireless power transfer may be improved further.

Here, in this specification, (at least a portion of) a plane A "facing" a plane B for example refers to (at least a portion of) the plane A overlapping inside a region extending perpendicular to the plane B in the range over which the plane B extends (in other words, inside the pillar-shaped region having the plane B as its cross section).

In this specification, at least a portion (preferably all) of the contact patch of the wheel 3 faces the coil plane of the power reception coil 51. From the standpoint of further raising the power reception efficiency, it is preferable if at least a portion (preferably all) of the coil plane of the power reception coil 51 faces the contact patch of the wheel 3, and/or at least a portion (preferably all) of the contact patch of the wheel 3 faces the coil plane of the power reception coil 51, like in the present embodiment.

The power reception coil 51 of the power reception device 5 is housed in the wheel 3 of the moving body 2 so as not to rotate together with the wheel 3. For example, as illustrated in FIG. 1, the power reception coil 51 may be installed in a portion that is attached to the wheel 3 from the inner radial side of the wheel 3, such as a cover 21a of the hub 21 in the moving body 2. With this arrangement, at least a portion of the power reception coil 51 is housed on the inner radial side of the wheel 32 in the state where the wheel 32 of the wheel 3 is attached to the hub 21 of the moving body 2.

In addition to the power reception coil 51, the power reception device 5 additionally may be provided with a power converter, a power storage unit, a measurement unit, and the like.

The power converter is provided with a converter that converts AC power to DC power, an inverter that converts DC power to AC power, and the like.

The power storage unit stores power generated in the power reception coil 51. The power storage unit may be a capacitor, for example. In the case where the power storage unit is a capacitor, charging and discharging can be performed in a short time compared to a storage battery or the like, which is advantageous in situations demanding high responsiveness.

The measurement unit measures the strength of the power received by the power reception device 5. The measurement unit is a voltmeter or an ammeter for example, but is not limited thereto. The strength of the power measured by the measurement unit may include numerical information of any type, such as electric power, electric energy, voltage, current, magnetic flux, or magnetic flux density for example.

Figure 2:
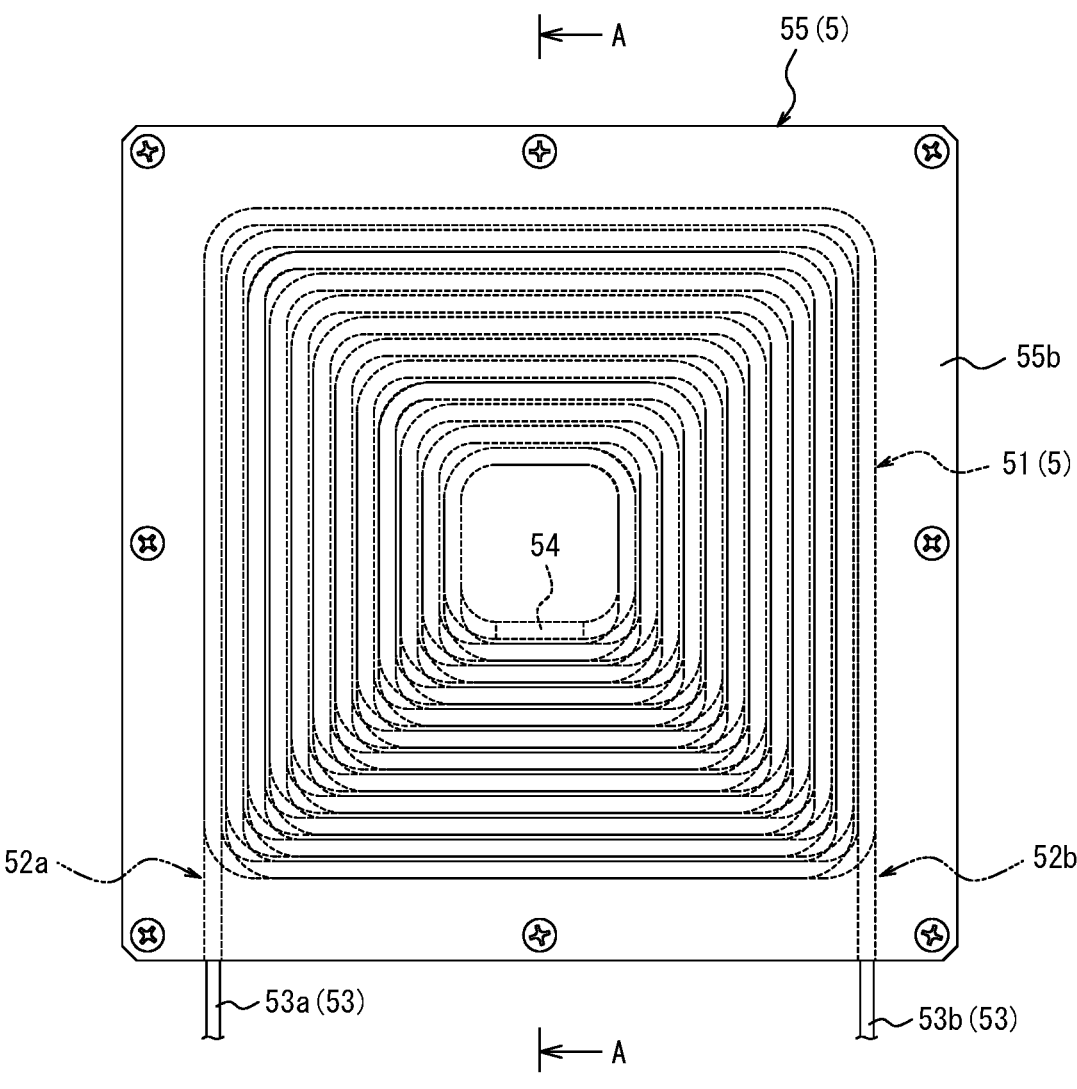
FIG. 2 is a plan view illustrating an example of a power reception coil.
Figure 3:
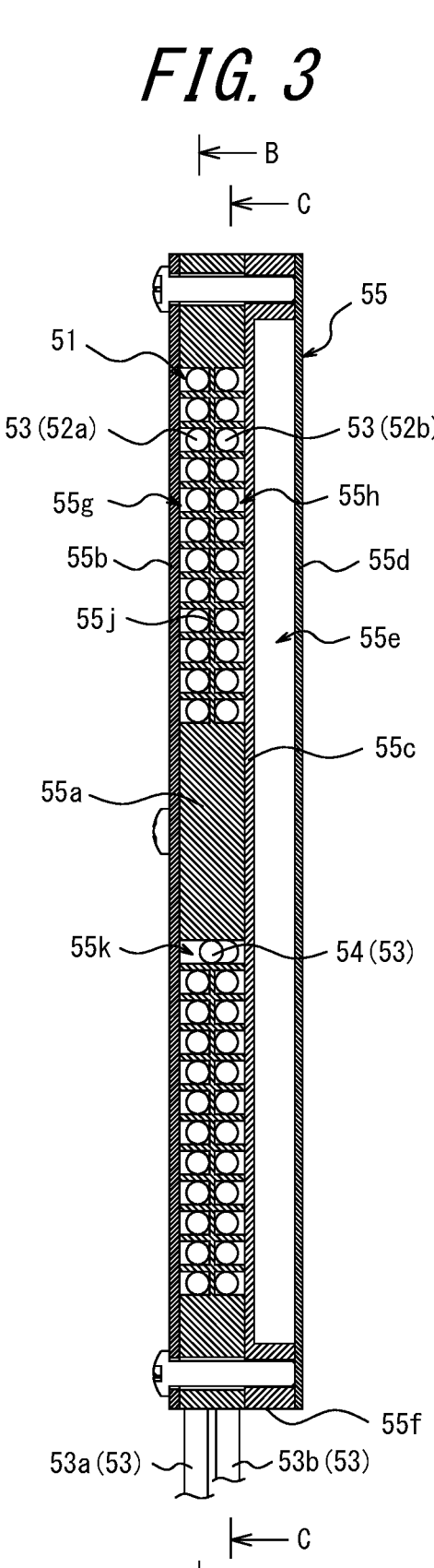
FIG. 3 is a cross section of the power reception coil taken along the line A-A in FIG. 2.
Figure 4:
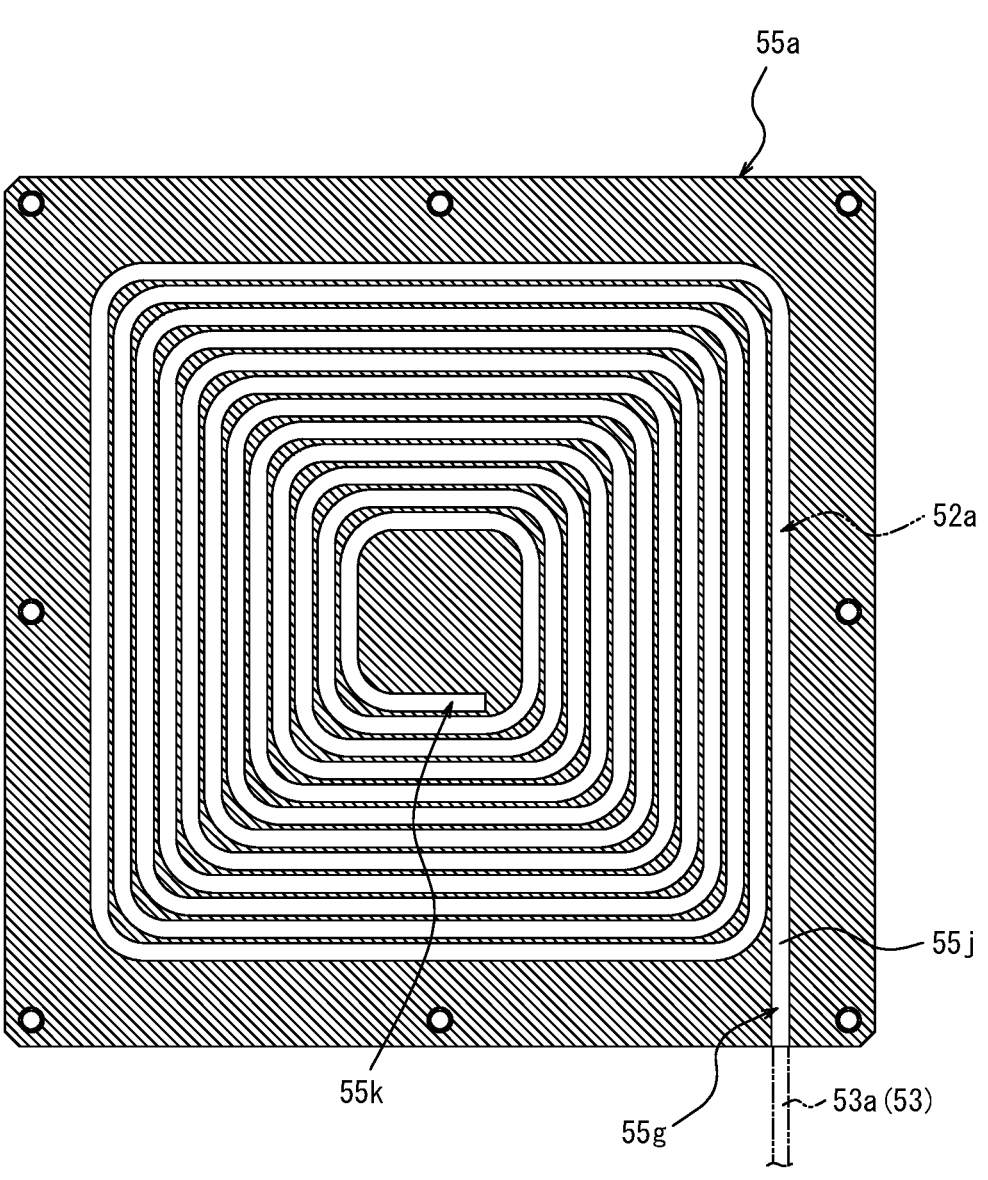
FIG. 4 is a cross section of the power reception coil taken along the line B-B in FIG. 3.
Figure 5:
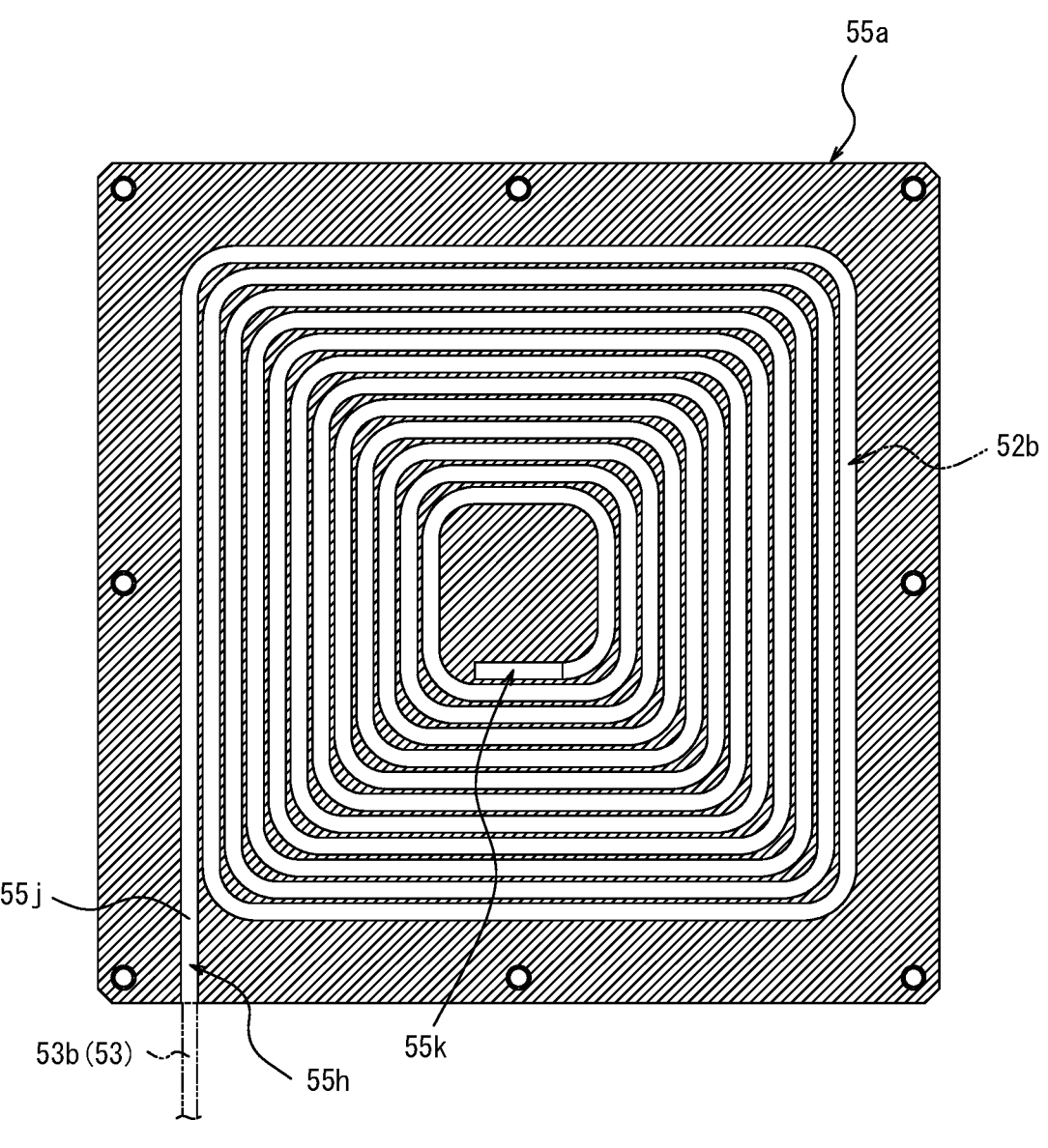
FIG. 5 is a cross section of the power reception coil taken along the line C-C in FIG. 3.
Figure 6:
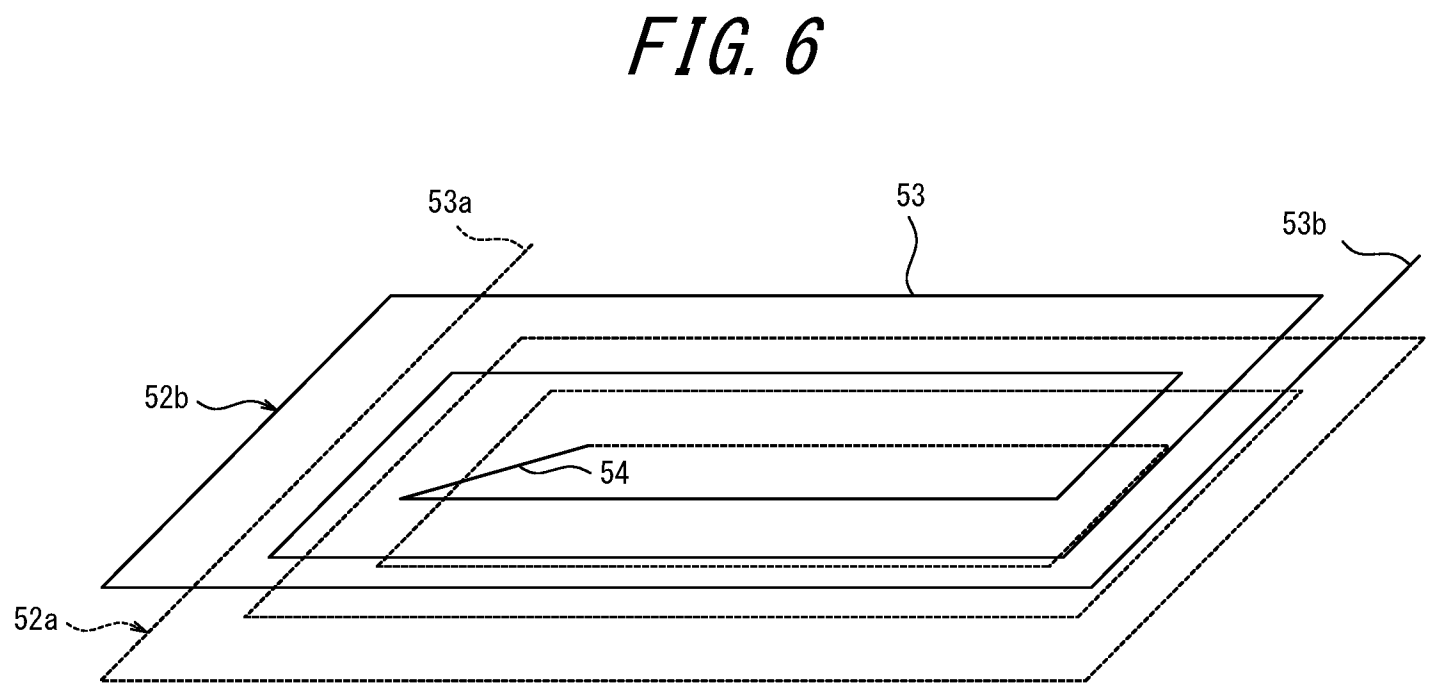

Hereinafter, FIGS. 2 to 6 will be referenced to describe an example of the power reception device 5 more specifically. The power reception device 5 is provided with the power reception coil 51 and a coil case 55. FIG. 2 is a plan view illustrating the power reception coil 51 as viewed from the direction orthogonal to the coil plane. FIG. 3 is a cross section of the power reception coil 51 and the coil case 55 taken along the line A-A in FIG. 2. FIG. 4 is a cross section of the power reception coil 51 and the coil case 55 taken along the line B-B in FIG. 3, and FIG. 5 is a cross section of the power reception coil 51 and the coil case 55 taken along the line C-C in FIG. 3. FIG. 6 is a perspective view schematically illustrating the winding structure of a wire rod 53 forming the power reception coil 51. Note that in FIGS. 4 and 5, the wire rod 53 is omitted from illustration to make it easy to understand the shapes of spiral grooves 55g and 55h. In FIG. 6, a first spiral coil layer 52a is indicated by dashed lines and a second spiral coil layer 52b is indicated by solid lines.

The power reception coil 51 can be configured in a multilayer structure including a stacked plurality of spiral coil layers 52a and 52b. The power reception coil 51 illustrated in FIGS. 2 to 6 has a two-layer structure including a first spiral coil layer 52a and a second spiral coil layer 52b stacked on top of one another. The power reception coil 51 is disposed such that the first spiral coil layer 52a faces the power transmission coil 41. In the power reception coil 51 installed in the moving body 2, the first spiral coil layer 52a is positioned lower than the second spiral coil layer 52b in the vertical direction. Note that the power reception coil 51 may also have three or more stacked spiral coil layers.

As illustrated in FIG. 2, the first spiral coil layer 52a and the second spiral coil layer 52b are placed on top of each other such that their central axes are positioned on the same straight line.

The spiral coil layers 52a and 52b are formed by winding the wire rod 53 into a spiral shape on the same surface (in this example, in the same plane). The extension direction of the central axes of the spiral coil layers 52a and 52b obtained by the winding of the wire rod 53 is treated as the axial direction of the power reception coil 51.

The wire rod 53 forming each of the spiral coil layers 52a and 52b is continuous throughout. The wire rod 53 forming the first spiral coil layer 52a and the wire rod 53 forming the second spiral coil layer 52b are continuous in an inner circumferential peripheral portion of each of the spiral coil layers 52a and 52b. In other words, a connecting portion 54 between the first spiral coil layer 52a and the second spiral coil layer 52b is positioned in an inner circumferential peripheral portion of the power reception coil 51 (an inner circumferential peripheral portion of each of the spiral coil layers 52a and 52b). Note that the wire rod 53 forming the first spiral coil layer 52a and the wire rod 53 forming the second spiral coil layer 52b do not have to be continuous in an inner circumferential peripheral portion of each of the spiral coil layers 52a and 52b. Moreover, the position of the connecting portion 54 is not limited to the inner circumferential peripheral portion of the power reception coil 51, and may also be provided in an outer circumferential peripheral portion of the power reception coil 51, for example. The wire rod 53 forming the first spiral coil layer 52a and the wire rod 53 forming the second spiral coil layer 52b may be joined by welding, pressure welding, or the like in the connecting portion 54, or as described later, the first spiral coil layer 52a and the second spiral coil layer 52b, including the connecting portion 54, may be formed by winding a single continuous wire rod 53.

The connecting portion 54 is preferably inclined with respect to the axial direction of the power reception coil 51, but may also be parallel to the axial direction of the power reception coil 51 (perpendicular to the coil plane of the power reception coil 51). In this example, the connecting portion 54 is inclined gently in the thickness direction of the power reception coil 51. Specifically, the connecting portion 54 is inclined so as to intersect with both the wire rod 53 forming the first spiral coil layer 52a and the wire rod 53 forming the second spiral coil layer 52b at obtuse angles (angles greater than 90° and less than 180°).

The first spiral coil layer 52a and the second spiral coil layer 52b are formed by winding a single continuous wire rod 53. That is, the first spiral coil layer 52a and the second spiral coil layer 52b, including the connecting portion 54, are formed by a single continuous wire rod 53. Note that a "single continuous wire rod 53" means a wire rod formed integrally as a whole, and includes litz wire containing multiple twisted strands of enameled wires, for example. Moreover, the wire rod 53 is preferably litz wire, but is not limited thereto and may also be solid wire, for example.

As illustrated in FIG. 6, the wire rod 53 forming the power reception coil 51 extends in a spiral from a winding start end (an end 53a of the wire rod 53) positioned on the outer circumferential peripheral side of the first spiral coil layer 52a and proceeding radially inward to form an approximately rectangular (more specifically, an approximately square) coil plane overall, joins the connecting portion 54 inclined with respect to the coil plane in the inner circumferential peripheral portion, and the connecting portion 54 smoothly joins the inner circumferential peripheral portion of the second spiral coil layer 52b. In addition, the wire rod 53 extends in a spiral shape from the inner circumferential peripheral portion of the second spiral coil layer 52b proceeding radially outward similarly to the first spiral coil layer 52a, and a winding terminal end (another end 53b of the wire rod 53) is positioned on the outer circumferential peripheral side. The end 53a and the other end 53b of the wire rod 53 are disposed on the same side surface 55f of the rectangular plate-shaped coil case 55 described later. Also, the end 53a and the other end 53b of the wire rod 53 are respectively positioned near either end of the side surface 55f in the longitudinal direction. By adopting such a configuration, the end 53a and the other end 53b can be disposed at positions that are farther apart.

The power reception device 5 is provided with the coil case 55 that supports the wire rod 53. The coil case 55 includes a case body 55a (wire rod support portion) formed using a resin containing an insulating material, a first cover 55b that covers the front surface of the case body 55a, and a second cover 55c that covers the back surface of the case body 55a. The first cover 55b and the second cover 55c are formed using a resin containing an insulating material. The coil case 55 in this example includes a third cover 55d provided on the outside (back side) of the second cover 55c. The third cover 55d may be formed using a resin or a metal such as aluminum.

The first spiral coil layer 52a is held between the case body 55a and the first cover 55b, while the second spiral coil layer 52b is held between the case body 55a and the second cover 55c. With this arrangement, the wire rod 53 forming the power reception coil 51 is housed inside the coil case 55, except for the ends 53a and 53b on either side. Consequently, it is possible to keep dust and the like from adhering to the wire rod 53.

The case body 55a, first cover 55b, second cover 55c, and third cover 55d forming the coil case 55 are fastened to one another by fastening members such as screws, or secured to one another by gluing, welding, or the like.

The coil case 55 has a space 55e between the second cover 55c and the third cover 55d, into which a plate-shaped magnetic body (ferrite member) or the like can be placed. By placing a magnetic body in the space 55e, or in other words, by providing a magnetic body on the back side of the second spiral coil layer 52b, the power reception efficiency of the power reception coil 51 can be raised.

Note that a magnetic body such as a ferrite core may also be provided farther inward (toward the central axis) than the inner circumferential peripheral portion of the power reception coil 51. In this case, a space for placing a magnetic body can be provided in the central portion of the case body 55a, for example.

The coil case 55 is formed into a flat plate shape overall. In addition, the coil case 55 has a rectangular shape, more specifically an approximately square shape, in a planar view from the axial direction of the power reception coil 51. However, the coil case 55 may also have a different shape in the same planar view. Also, the case body 55a, first cover 55b, second cover 55c, and third cover 55d forming the coil case 55 similarly have a rectangular plate shape in a planar view, and are disposed overlapping in the thickness direction of the coil case 55. Note that the coil case 55 is not limited to a flat case like in this example and may also be curved, bent, or have depressed or raised portions.

The spiral grooves 55g and 55h are formed on the front surface and the back surface, respectively, of the case body 55a, and the wire rod 53 is disposed to follow the spiral grooves 55g and 55h. The wire rod 53 disposed to follow the spiral groove 55g on the front surface of the case body 55a forms the first spiral coil layer 52a, and the wire rod 53 disposed to follow the spiral groove 55h on the back surface of the case body 55a forms the second spiral coil layer 52b. A partition wall 55j is provided between the spiral groove 55g on the front surface and the spiral groove 55h on the back surface of the case body 55a.

The spiral groove 55g on the front surface and the spiral groove 55h on the back surface of the case body 55a are spaced apart by a predetermined distance (at least the thickness of the partition wall 55j or more) in the thickness direction (axial direction of the power reception coil 51) of the case body 55a by the partition wall 55j. Additionally, the spiral groove 55g on the front surface and the spiral groove 55h on the back surface communicate through a through-hole 55k formed in the partition wall 55j. The through-hole 55k penetrates from the groove bottom of the spiral groove 55g on the front surface (front surface of the partition wall

10

55j) to the groove bottom of the spiral groove 55h on the back surface (back surface of the partition wall 55j).

The through-hole 55k is formed at a position corresponding to the connecting portion 54 of the power reception coil 51. Consequently, the position of the through-hole 55k can be adjusted, as appropriate, in correspondence with the position of the connecting portion 54 of the power reception coil 51. In this example, the through-hole 55k is positioned in the central part of the case body 55a, and more specifically, at a position corresponding to the inner circumferential peripheral portion of the power reception coil 51. With this arrangement, the connecting portion 54 of the power reception coil 51 can be disposed in the through-hole 55k.

Referring to FIG. 1 again, the onboard device 6 is installed in the moving body 2 and is electrically connected to the power reception device 5. The power reception device 5 and the onboard device 6 may be electrically connected in a wired way. In such a case, the power transmission efficiency from the power reception device 5 to the onboard device 6 is improved compared to the case of a wireless connection. Also, the power reception device 5 and the onboard device 6 may be electrically connected in a wireless way. In such a case, for example, it is unnecessary to run power lines for transmitting power from the power reception device 5 to the onboard device 6 installed in the body of the moving body 2 away from the wheel 3, thereby lowering the possibility that the power lines may be severed in association with the rotation of the wheel 3.

The onboard device 6 may also include a driving device 61 that drives the wheel 3 with electric power, for example. In such a case, the driving device 61 consumes power supplied from the power reception device 5 to drive the wheel 3. In the present embodiment, the driving device 61 is an in-wheel motor housed, at least in part, in the wheel 3, but is not limited thereto. The driving device 61 may also be an onboard motor which is installed in the body of the moving body 2 and which causes the wheel 3 to be driven by driving a shaft 22 of the moving body 2.

As another example, the onboard device 6 may also include a power storage device 62 that stores electric power. The power storage device 62 can store electric power supplied from the power reception device 5 and also supply electric power to other onboard devices 6. For example, the power storage device 62 may be a storage battery of any type, such as a lead storage battery, a nickel hydride battery, a lithium-ion battery, a sodium-sulfur battery, or a combination of the above.

The onboard device 6 is not limited to the examples described above and may also include any electronic devices installed in the moving body 2, such as a communication device for the moving body 2, a car navigation system, a media player, and in-vehicle sensors. The onboard device 6 may be integrated into the moving body 2 or removably installed in the moving body 2.

Figure 7:
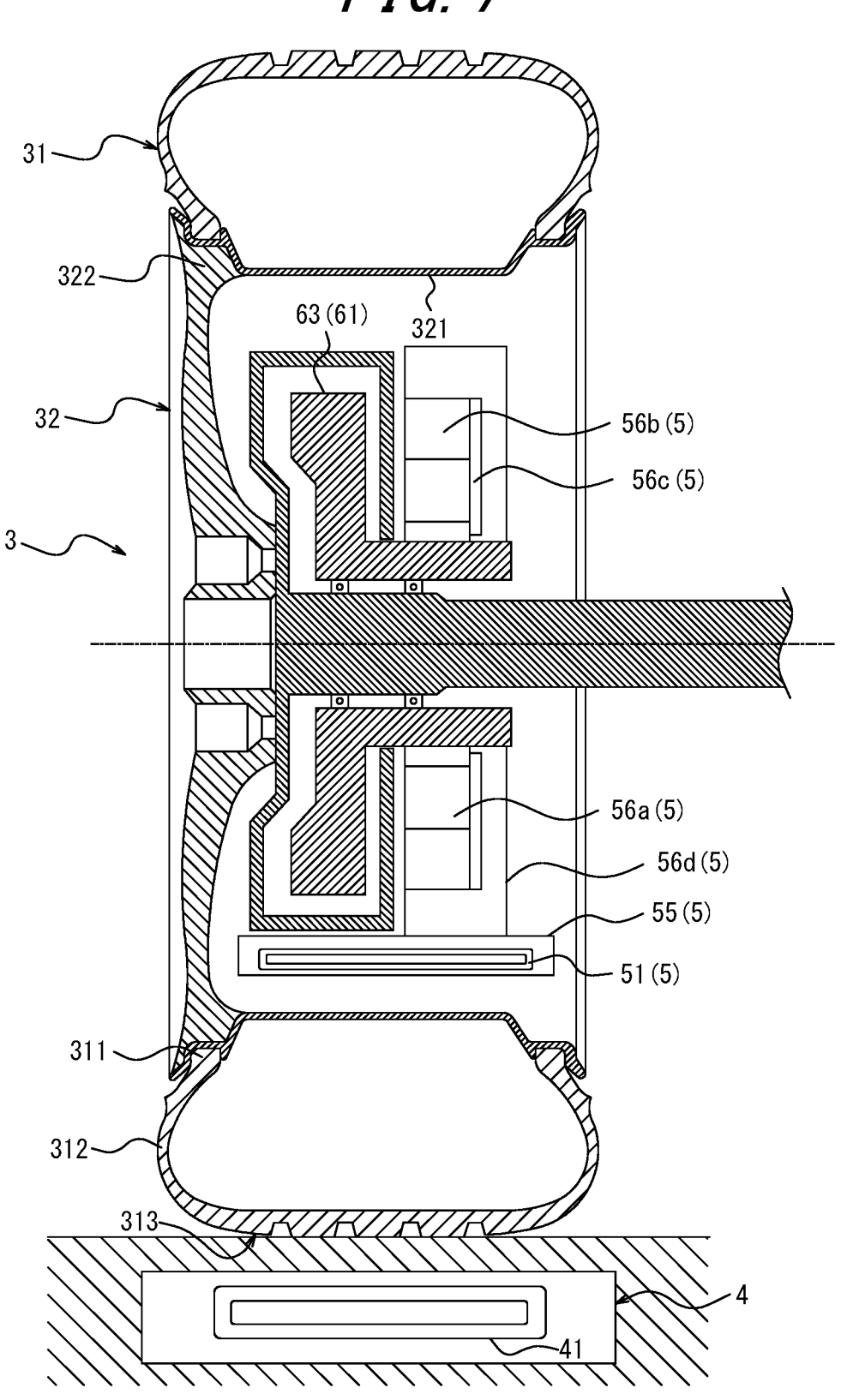
FIG. 7 is a schematic diagram that uses a lateral cross section of a wheel to generally illustrate a tire and wheel assembly as one example of a wheel in a wireless power reception system according to an embodiment of the present disclosure.
Figure 8:
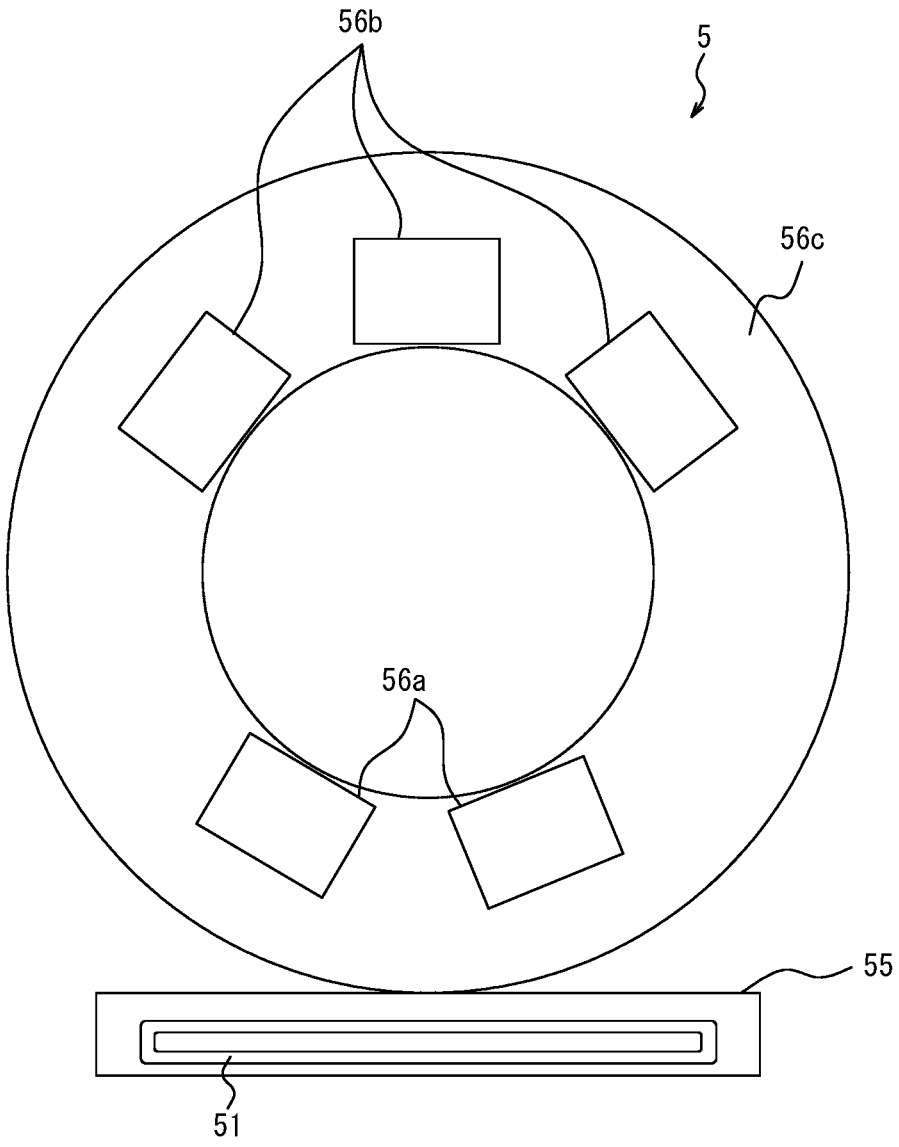
FIG. 8 is a schematic diagram that generally illustrates a converter and an inverter of a power reception device housed in the wheel in FIG. 7.

Hereinafter, FIGS. 7 and 8 will be referenced to describe an example of the power reception device 5 and the driving device 61 specifically. FIG. 7 is a schematic diagram that uses a lateral cross section of the wheel 3 to generally illustrate a tire and wheel assembly as one example of the wheel 3 in the wireless power reception system 1. FIG. 8 is a schematic diagram that generally illustrates a converter 56a and an inverter 56b of the power reception device 5 housed in the wheel 3 in FIG. 7. In this example, the driving device 61 is an in-wheel motor installed in the wheel 3, and is housed, at least in part, in the wheel 3.

As illustrated in FIGS. 7 and 8, the power reception device 5 is provided with the converter 56a and the inverter 56*b* as power converters. The converter 56*a* is connected to the power reception coil 51 and the inverter 56*b*. The converter 56*a* can convert AC power generated in the power reception coil 51 into DC power, and transmit power to the inverter 56*b*. The inverter 56*b* is connected to the converter 56*a* and the driving device 61. The inverter 56*b* can convert DC power from the converter 56*a* into AC power, and transmit power to the driving device 61.

The converter 56*a* is positioned vertically above the power reception coil 51, and the inverter 56*b* is positioned vertically above the converter 56*a*. In this example, the entire converter 56*a* and the entire inverter 56*b* are housed in the wheel 3. Note that it is sufficient if at least a portion of the converter 56*a* and the inverter 56*b* are housed in the wheel 3.

The converter 56*a* and the inverter 56*b* are provided on an annular substrate 56*c* disposed coaxially with the wheel 3. The power reception coil 51 is positioned below the substrate 56*c*. Note that the power reception coil 51 may also at a position that overlaps with the substrate 56*c* in the vertical direction.

As illustrated in FIG. 8, the converter 56*a* and the inverter 56*b* are disposed at different circumferential positions on the annular substrate 56*c*. The converter 56*a* and the inverter 56*b* are disposed concentrically on the substrate 56*c*. The converter 56*a* is positioned in a lower portion of the substrate 56*c*, and the inverter 56*b* is positioned in an upper portion of the substrate 56*c*.

The driving device 61 is a direct drive motor 63 disposed coaxially with the wheel 3. The direct drive motor 63 is disposed coaxially with the wheel 3. In addition, the direct drive motor 63 is housed entirely in the wheel 3. Note that it is sufficient if at least a portion of the direct drive motor 63 is housed in the wheel 3.

The power reception device 5 includes the coil case 55 housing the power reception coil 51. The coil case 55 is provided integrally with a case 56*d* that houses the converter 56*a*. Note that the coil case 55 may also be joined to the case 56*d*. Also, the coil case 55 may be provided independently from the case 56*d* that houses the converter 56*a*. The case 56*d* is housed entirely in the wheel 3. The case 56*d* encloses the substrate 56*c*, the converter 56*a*, the inverter 56*b*, and the direct drive motor 63 from the outside. Note that the case 56*d* that houses the converter 56*a* is not a required component.

The control device 7 controls at least one of the power reception device 5 or the onboard device 6. The control device 7 is an electronic control unit (ECU), for example, but is not limited thereto and may be electronic equipment of any type. The control device 7 may also be electrically connected to the power reception device 5 as one of the onboard devices 6 described above.

The control device 7 may be provided with a control unit, a storage unit, a communication unit, an output unit, an input unit, and the like, for example. For example, the control device 7 can cause the power reception device 5 to transmit power received wirelessly by the power reception device 5 to at least one of a plurality of onboard devices 6, including the driving device 61 and the power storage device 62 for example, on the basis of a predetermined condition.

Figure 9:
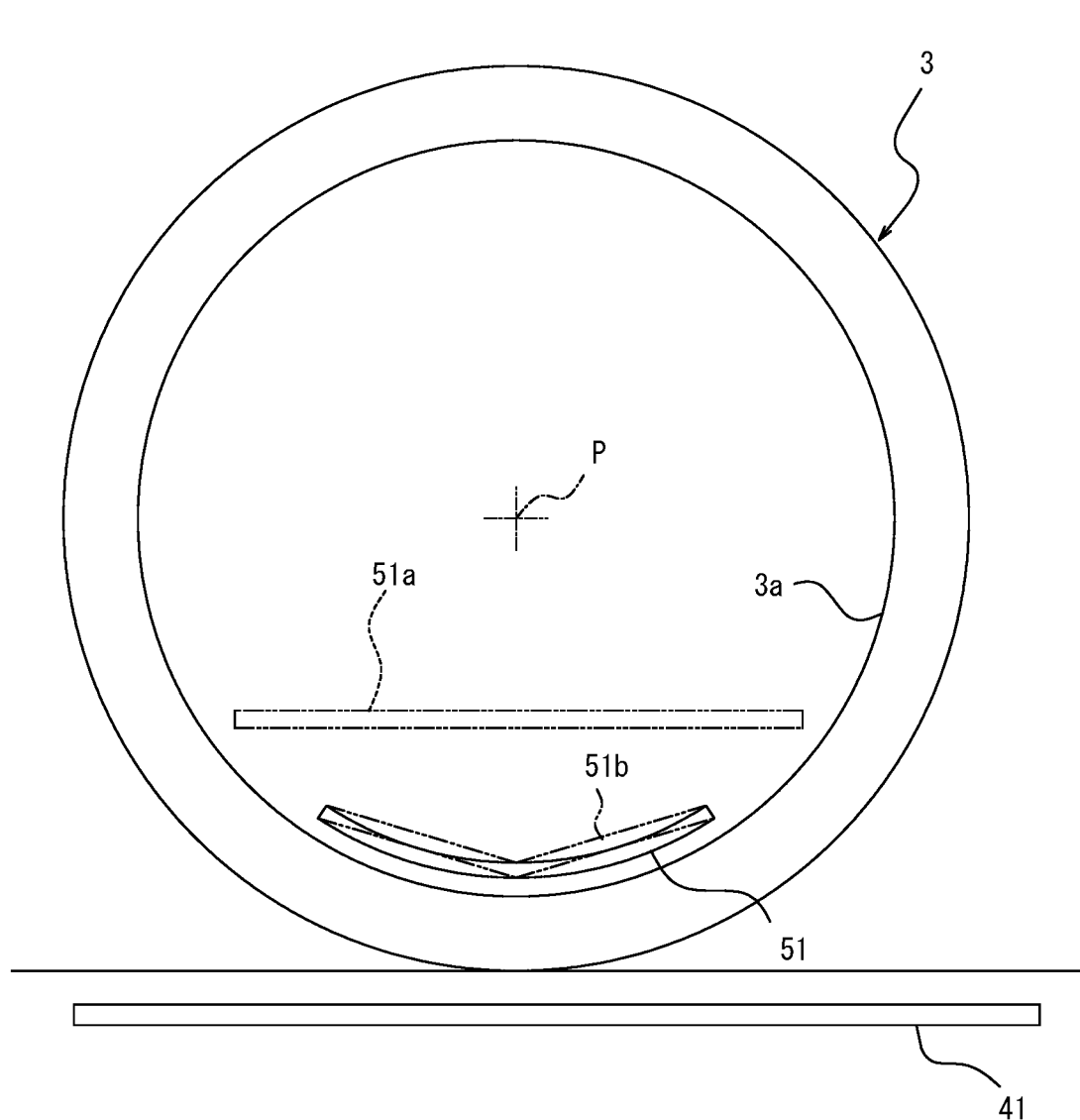
FIG. 9 is a schematic diagram that generally illustrates an example of a power reception coil installed in a wheel.

Hereinafter, FIGS. 9 and 10 will be referenced to describe another example of the power reception coil 51 specifically. The power reception coil 51 illustrated in FIG. 9 has a convex shape pointing downward in a side view as seen from the axial direction of the wheel 3. FIG. 9 schematically illustrates only the wheel 3 and the power reception coil 51. Also, in FIG. 9, a power reception coil 51*a* having a flat shape extending horizontally in a side view as seen from the axial direction of the wheel 3 is indicated by a chain double-dashed line for comparison. Also, in FIG. 9, a power reception coil 51*b* having a convex bent shape pointing downward in a side view is indicated by a chain double-dashed line for comparison. The power reception coil 51*b* has the same width and the same height as the power reception coil 51 in a side view. Note that the power reception coil 51 illustrated in FIG. 9 has a single-layer structure including a single spiral coil layer, but is not limited thereto.

The power reception coil 51 illustrated in FIG. 9 is curved into an arc shape overall in a side view. The power reception coil 51 is not limited to a shape curved into an arc and may be configured to have at least a convex, non-flat shape pointing downward overall, such as by being bent into a downward-pointing V-shape like the power reception coil 51*b*, for example. Also, although omitted from illustration in the diagram, the power reception device 5 may also include a curved coil case corresponding to the shape of the power reception coil 51.

In the power reception coil 51 illustrated in FIG. 9, the center of curvature P of the power reception coil 51 in a side view is located on the central axis of the wheel 3. With this arrangement, the power reception coil 51 can be disposed to follow the inner circumferential surface 3*a* of the wheel 3. Note that the inner circumferential surface 3*a* of the wheel 3 can be taken to be the inner circumferential surface of the rim portion 321, for example, but is not limited thereto.

Figure 10:
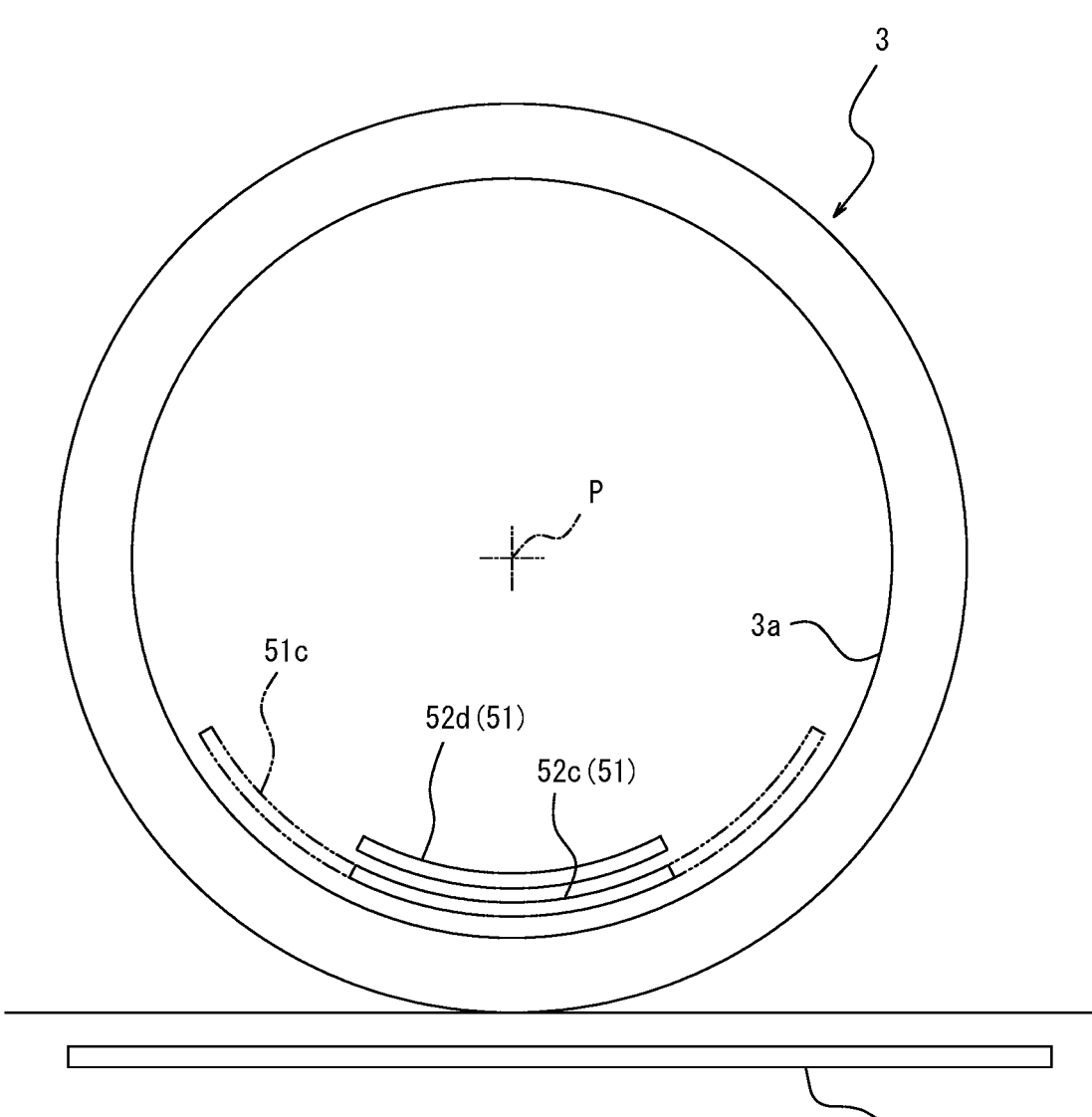
FIG. 10 is a schematic diagram that generally illustrates another example of a power reception coil installed in a wheel.

The power reception coil 51 illustrated in FIG. 10 includes a stacked plurality of spiral coil layers 52*c* and 52*d*. FIG. 10 schematically illustrates only the wheel 3 and the power reception coil 51. Also, in FIG. 10, a power reception coil 51*c* having a single-layer structure including a single spiral coil layer is indicated by a chain double-dashed line for comparison. In the case where the power reception coil is long in the wheel circumferential direction like the power reception coil 51*c*, the ends of the power reception coil 51*c* in the wheel circumferential direction become distant from the power transmission coil 41 more easily. For this reason, by configuring the power reception coil 51 to have a multilayer structure including the plurality of spiral coil layers 52*c* and 52*d* to reduce the length in the wheel circumferential direction, the average distance between the power transmission coil 41 installed in a road surface and the power reception coil 51 can be reduced, as illustrated in FIG. 10. Note that in the power reception coil 51 illustrated in FIG. 10, the center of curvature P of the power reception coil 51 in a side view likewise is located on the central axis of the wheel 3, but is not limited thereto. Also, the power reception coil 51 in FIG. 10 has two layers including the spiral coil layers 52*c* and 52*d*, but may also have three or more spiral coil layers.

Other than being curved in a side view, the power reception coil 51 illustrated in FIG. 10 can be configured similarly to the power reception coil 51 having the multilayer structure described with reference to FIGS. 2 to 6. For example, the two spiral coil layers 52*c* and 52*d* may be wound using a single, continuous wire rod 53. Additionally, the power reception device 5 may be provided with a curved coil case 55 in correspondence with the power reception coil 51. In this case, the coil case 55 may be provided with the case body 55*a* (wire rod support portion), the first cover 55*b*, the second cover 55*c*, the third cover 55*d*, and the like having curved shapes corresponding to the shape of the power reception coil 51. Moreover, the two spiral coil layers 52*c* and 52*d* may also be formed by disposing the wire rod

53 to follow spiral grooves provided on the front and back surfaces of the case body 55*a*.

As described above, the wireless power reception system 1 according to an embodiment of the present disclosure includes: the power reception device 5 including the power reception coil 51 that receives power supplied wirelessly from the power transmission coil 41 of the power transmission device 4 installed in a road surface, at least a portion of the power reception coil 51 being housed in the wheel 3 of the moving body 2; and the onboard device 6 which is installed in the moving body 2 and which is electrically connected to the power reception device 5, wherein the power reception device 5 can transmit received power to the onboard device 6, and the power reception coil 51 has a convex shape pointing downward in a side view as seen from the axial direction of the wheel 3. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the wireless power reception system 1 can improve the power reception efficiency in wireless power transfer.

Also, according to the wireless power reception system 1 according to an embodiment of the present disclosure, since the power reception coil 51 has a convex shape pointed downward in a side view as seen from the axial direction of the wheel 3, the average distance between the power transmission coil 41 installed in a road surface and the power reception coil 51 can be reduced compared to the power reception coil 51*a* having a flat shape extending horizontally in a side view. As a result, the power transfer efficiency of the wireless power reception system 1 including the power reception coil 51 can be raised.

In the wireless power reception system 1 according to an embodiment of the present disclosure, the power reception coil 51 is curved into an arc shape in a side view. According to such a configuration, the average distance between the power transmission coil 41 and the power reception coil 51 can be reduced further, and the power transfer efficiency of the wireless power reception system 1 can be raised further compared to the power reception coil 51*b* bent into a V-shape with the same width and the same height in a side view, for example.

In the wireless power reception system 1 according to an embodiment of the present disclosure, the center of curvature P of the power reception coil 51 in a side view is located on the central axis of the wheel 3. According to such a configuration, since the power reception coil 51 can be disposed to follow the inner circumferential surface 3*a* of the wheel 3, the average distance between the power transmission coil 41 and the power reception coil 51 can be reduced further, and the power transfer efficiency of the wireless power reception system 1 can be raised further. In addition, by disposing the power reception coil 51 to follow the inner circumferential surface 3*a* of the wheel 3, the space inside the wheel 3 can be utilized effectively.

In the wireless power reception system 1 according to an embodiment of the present disclosure, the power reception coil 51 includes a stacked plurality of spiral coil layers 52*c* and 52*d*. According to such a configuration, the length of the power reception coil 51 in the circumferential direction of the wheel 3 in a side view can be reduced compared to the power reception coil 51*c* having a single-layer structure including a single spiral coil layer. For this reason, the average distance between the power transmission coil 41 installed in a road surface and the power reception coil 51 can be reduced further, and the power transfer efficiency can be raised further.

The moving body 2 according to an embodiment of the present disclosure includes: the wheel 3; the power reception device 5 including the power reception coil 51 that receives power supplied wirelessly from the power transmission coil 41 of the power transmission device 4 installed in a road surface, at least a portion of the power reception coil 51 being housed in the wheel 3; and the onboard device 6 electrically connected to the power reception device 5, wherein the power reception device 5 can transmit received power to the onboard device 6, and the power reception coil 51 has a convex shape pointing downward in a side view as seen from the axial direction of the wheel 3. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the moving body 2 can improve the power reception efficiency in wireless power transfer. Also, since the power reception coil 51 has a convex shape pointed downward in a side view as seen from the axial direction of the wheel 3, the average distance between the power transmission coil 41 installed in a road surface and the power reception coil 51 can be reduced compared to the power reception coil 51*a* having a flat shape extending horizontally in a side view. As a result, the power transfer efficiency of the wireless power reception system 1 including the power reception coil 51 can be raised.

The wheel 3 according to an embodiment of the present disclosure is a wheel 3 of the moving body 2 and includes: the power reception device 5 including the power reception coil 51 that receives power supplied wirelessly from the power transmission coil 41 of the power transmission device 4 installed in a road surface, wherein at least a portion of the power reception coil 51 is housed in the wheel 3, and the power reception coil 51 has a convex shape pointing downward in a side view as seen from the axial direction of the wheel 3. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the wheel 3 can improve the power reception efficiency in wireless power transfer. Also, since the power reception coil 51 has a convex shape pointed downward in a side view as seen from the axial direction of the wheel 3, the average distance between the power transmission coil 41 installed in a road surface and the power reception coil 51 can be reduced compared to the power reception coil 51*a* having a flat shape extending horizontally in a side view. As a result, the power transfer efficiency of the wireless power reception system 1 including the power reception coil 51 can be raised.

Also, the wireless power reception system 1 embodied as illustrated in FIGS. 2 to 6 includes: the power reception device 5 including the power reception coil 51 that receives power supplied wirelessly from the power transmission coil 41 of the power transmission device 4 installed in a road surface, at least a portion of the power reception coil 51 being housed in the wheel 3 of the moving body 2; and the onboard device 6 which is installed in the moving body 2 and which is electrically connected to the power reception device 5, wherein the power reception device 5 transmits received power to the onboard device 6. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the wireless power reception system 1 can improve the power reception efficiency in wireless power transfer.

Also, according to the wireless power reception system 1 embodied as illustrated in FIGS. 2 to 6, the power reception coil 51 includes the stacked plurality of spiral coil layers 52a and 52b, and therefore the area of the coil surface can be reduced compared to a power reception coil with a single-layer structure (a power reception coil having only a single spiral coil layer) having similar power reception capability. In other words, the number of windings in the power reception coil 51 overall can be secured to obtain the power reception capability with the plurality of spiral coil layers 52a and 52b, while at the same time, the area of the coil surface of the power reception coil 51 can be restrained. For this reason, the degree of freedom with respect to the installation range of the power reception coil 51 is improved, making it possible to house the power reception coil 51 over a wide range in the wheel 3. Also, since the area of the coil surface can be reduced, installation at a position close to the power transmission coil 41 is easier, thereby further improving the power reception efficiency of the power reception device 5.

In the wireless power reception system 1 embodied as illustrated in FIGS. 2 to 6, the power reception coil 51 has a two-layer structure including the first spiral coil layer 52a and the second spiral coil layer 52b. According to such a configuration, the winding structure of the wire rod does not become complicated as readily as in the case of providing three or more spiral coil layers, making it easy to manufacture the power reception coil 51.

In the wireless power reception system 1 embodied as illustrated in FIGS. 2 to 6, the wire rod 53 forming the first spiral coil layer 52a and the wire rod 53 forming the second spiral coil layer 52b are continuous in the inner circumferential peripheral portion of the power reception coil 51. According to such a configuration, a complicated configuration of the power reception device 5 can be prevented compared to the case where the first spiral coil layer 52a and the second spiral coil layer 52b are independent from each other, and the overall power reception device 5 can be given a simple configuration. Moreover, by providing the connecting portion 54 on the inner circumferential peripheral portion of the power reception coil 51, it is easier to dispose the ends 53a and 53b of the wire rod 53 of the power reception coil 51 apart from each other. For this reason, since the distance between portions of the wire rod 53 can be secured appropriately, loss arising from a proximity effect can be reduced. As a result, the power reception efficiency of the power reception device 5 can be improved further.

In the wireless power reception system 1 embodied as illustrated in FIGS. 2 to 6, the wire rod 53 forming the first spiral coil layer 52a and the wire rod 53 forming the second spiral coil layer 52b are formed by a single, continuous wire rod 53. According to such a configuration, the power transmission loss can be reduced compared to the case of forming the power reception coil 51 by joining a plurality of wire rods 53. Furthermore, since joining a plurality of wire rods 53 is unnecessary, the manufacturing of the power reception coil 51 is also easy.

In the wireless power reception system 1 embodied as illustrated in FIGS. 2 to 6, the power reception coil 51 is provided with the plate-shaped case body 55a (wire rod support portion) containing an insulating material, and the wire rod 53 is disposed to follow the spiral grooves 55g and 55h formed in the case body 55a. According to such a configuration, the wire rod 53 forming the power reception coil 51 can be held in a stable state. Additionally, since the distance between portions of the wire rod 53 forming the power reception coil 51 can be secured appropriately, loss arising from a proximity effect can be reduced. As a result, the power reception efficiency of the power reception device 5 can be improved further.

In the wireless power reception system 1 embodied as illustrated in FIGS. 2 to 6, the spiral grooves 55g and 55h are formed on the front and back surfaces, respectively, of the case body 55a, such that the spiral groove 55g formed on the front surface and the spiral groove 55h formed on the back surface communicate through the through-hole 55k formed in the case body 55a. According to such a configuration, by disposing the wire rod 53 to follow the spiral groove 55g on the front surface and the spiral groove 55h on the back surface of the case body 55a, the stacked plurality of spiral coil layers 52a and 52b can be formed easily. Moreover, by passing the wire rod 53 through the through-hole 55k, the first spiral coil layer 52a on the front side and the second spiral coil layer 52b on the back side of the case body 55a can be made to be continuous easily.

The moving body 2 embodied as illustrated in FIGS. 2 to 6 includes: the wheel 3; the power reception device 5 including the power reception coil 51 that receives power supplied wirelessly from the power transmission coil 41 of the power transmission device 4 installed in a road surface, at least a portion of the power reception coil 51 being housed in the wheel 3; and the onboard device 6 electrically connected to the power reception device 5, wherein the power reception device 5 can transmit received power to the onboard device 6, and the power reception coil 51 includes the stacked plurality of spiral coil layers 52a and 52b. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the moving body 2 can improve the power reception efficiency in wireless power transfer. Also, the power reception coil 51 includes the stacked plurality of spiral coil layers 52a and 52b, and therefore the area of the coil surface as viewed from the axial direction of the power reception coil 51 can be reduced compared to a power reception coil with a single-layer structure having similar power reception capability. For this reason, the degree of freedom with respect to the installation range of the power reception coil 51 is improved, making it possible to house the power reception coil 51 over a wide range in the wheel 3. Also, installation at a position close to the power transmission coil 41 is easier, thereby further improving the power reception efficiency of the power reception device 5.

The wheel 3 embodied as illustrated in FIGS. 2 to 6 is a wheel 3 of the moving body 2 and includes: the power reception device 5 including the power reception coil 51 that receives power supplied wirelessly from the power transmission coil 41 of the power transmission device 4 installed in a road surface, wherein at least a portion of the power reception coil 51 is housed in the wheel 3, and the power reception coil 51 includes the stacked plurality of spiral coil layers 52a and 52b. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the wheel 3 can improve the power reception efficiency in wireless power transfer. Also, the power reception coil 51 includes the stacked plurality of spiral coil layers 52*a* and 52*b*, and therefore the area of the coil surface as viewed from the axial direction of the power reception coil 51 can be reduced compared to a power reception coil with a single-layer structure having similar power reception capability. For this reason, the degree of freedom with respect to the installation range of the power reception coil 51 is improved, making it possible to house the power reception coil 51 over a wide range in the wheel 3. Also, installation at a position close to the power transmission coil 41 is easier, thereby further improving the power reception efficiency of the power reception device 5.

Also, the wireless power reception system 1 embodied as illustrated in FIGS. 7 and 8 includes: the power reception device 5 including the power reception coil 51 that receives power supplied wirelessly from the power transmission coil 41 of the power transmission device 4 installed in a road surface, at least a portion of the power reception coil 51 being housed in the wheel 3 of the moving body 2; and the driving device 61 which is installed in the wheel 3 and which drives the wheel 3 with power received by the power reception device 5, wherein the power reception device 5 is provided with the converter 56*a* that converts AC power generated in the power reception coil 51 into DC power and the inverter 56*b* that can convert DC power from the converter 56*a* into AC power to transmit power to the driving device 61, at least a portion of the converter 56*a* and at least a portion of the inverter 56*b* are housed in the wheel 3, the converter 56*a* is positioned vertically above the power reception coil 51, and the inverter 56*b* is positioned vertically above the converter 56*a*. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the wireless power reception system 1 can improve the power reception efficiency in wireless power transfer.

Also, according to the wireless power reception system 1 embodied as illustrated in FIGS. 7 and 8, by positioning the converter 56*a* vertically above the power reception coil 51 and positioning the inverter 56*b* vertically above the converter 56*a*, it is easier to dispose the power reception coil 51 close to the power transmission coil 41, and in addition, the power transfer from the power transmission coil 41 to the power reception coil 51 is not inhibited as much by the inverter 56*b* and the converter 56*a*. Therefore, the power reception efficiency can be raised. Also, since it is easier to dispose the power reception coil 51 and the converter 56*a* close to each other, power transmission loss occurring when transmitting power from the power reception coil 51 to the converter 56*a* can be reduced. Moreover, it is easy to shorten the power transmission pathway from the power reception coil 51 to the driving device 61 through the converter 56*a* and the inverter 56*b*. For this reason, the power transmission loss can be reduced, and it is easier to utilize the space inside the wheel 3 effectively.

In the wireless power reception system 1 embodied as illustrated in FIGS. 7 and 8, the converter 56*a* and the inverter 56*b* are provided on the annular substrate 56*c* disposed coaxially with the wheel 3. According to such a configuration, the converter 56*a* and the inverter 56*b* can be installed efficiently around the axial part of the wheel 3, and the space inside the wheel 3 can be utilized effectively.

In the wireless power reception system 1 embodied as illustrated in FIGS. 7 and 8, the driving device 61 is the direct drive motor 63 disposed coaxially with the wheel 3. According to such a configuration, the torque of the direct drive motor 63 can be transferred to the wheel 3 directly without going through an indirect mechanism (such as a gearbox), and therefore motive power loss can be reduced to drive the wheel 3 efficiently.

In the wireless power reception system 1 embodied as illustrated in FIGS. 7 and 8, the power reception device 5 includes the coil case 55 that houses the power reception coil 51, and the coil case 55 is integrated with or joined to the case 56*d* that houses the converter 56*a*. According to such a configuration, it is easier to stabilize the positional relationship between the power reception coil 51 and the converter 56*a*. Moreover, integrating the coil case 55 with the case 56*d* that houses the converter 56*a* makes it easier to configure a compact power reception device 5.

The moving body 2 embodied as illustrated in FIGS. 7 and 8 includes: the wheel 3; the power reception device 5 including the power reception coil 51 that receives power supplied wirelessly from the power transmission coil 41 of the power transmission device 4 installed in a road surface, at least a portion of the power reception coil 51 being housed in the wheel 3; and the driving device 61 which is installed in the wheel 3 and which drives the wheel 3 with power received by the power reception device 5, wherein the power reception device 5 is provided with the converter 56*a* that converts AC power generated in the power reception coil 51 into DC power and the inverter 56*b* that can convert DC power from the converter 56*a* into AC power to transmit power to the driving device 61, at least a portion of the converter 56*a* and at least a portion of the inverter 56*b* are housed in the wheel 3, the converter 56*a* is positioned vertically above the power reception coil 51, and the inverter 56*b* is positioned vertically above the converter 56*a*. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the wireless power reception system 1 can improve the power reception efficiency in wireless power transfer. Also, by positioning the converter 56*a* vertically above the power reception coil 51 and positioning the inverter 56*b* vertically above the converter 56*a*, it is easier to dispose the power reception coil 51 close to the power transmission coil 41, and in addition, the power transfer from the power transmission coil 41 to the power reception coil 51 is not inhibited as much by the inverter 56*b* and the converter 56*a*. Therefore, the power reception efficiency can be raised. Also, since it is easier to dispose the power reception coil 51 and the converter 56*a* close to each other, power transmission loss occurring when transmitting power from the power reception coil 51 to the converter 56*a* can be reduced. Moreover, it is easy to shorten the power transmission pathway from the power reception coil 51 to the driving device 61 through the converter 56*a* and the inverter 56*b*. For this reason, the power transmission loss can be reduced, and it is easier to utilize the space inside the wheel 3 effectively.

The wheel 3 embodied as illustrated in FIGS. 7 and 8 is a wheel 3 of the moving body 2 and includes: the power reception device 5 including the power reception coil 51 that receives power supplied wirelessly from the power transmission coil 41 of the power transmission device 4 installed in a road surface; and the driving device 61 that drives the wheel 3 with power received by the power reception device 5, wherein the power reception device 5 is provided with the converter 56a that converts AC power generated in the power reception coil 51 into DC power and the inverter 56b that can convert DC power from the converter 56a into AC power to transmit power to the driving device 61, the wheel 3 internally houses at least a portion of the converter 56a and at least a portion of the inverter 56b, the converter 56a is positioned vertically above the power reception coil 51, and the inverter 56b is positioned vertically above the converter 56a. According to such a configuration, by housing at least a portion of the power reception coil 51 in the wheel 3 that directly contacts the road surface, it is possible to lower the possibility that an obstacle will come into the space between the power transmission coil 41 provided in the road surface and the power reception coil 51. For this reason, the wireless power reception system 1 can improve the power reception efficiency in wireless power transfer. Also, by positioning the converter 56a vertically above the power reception coil 51 and positioning the inverter 56b vertically above the converter 56a, it is easier to dispose the power reception coil 51 close to the power transmission coil 41, and in addition, the power transfer from the power transmission coil 41 to the power reception coil 51 is not inhibited as much by the inverter 56b and the converter 56a. Therefore, the power reception efficiency can be raised. Also, since it is easier to dispose the power reception coil 51 and the converter 56a close to each other, power transmission loss occurring when transmitting power from the power reception coil 51 to the converter 56a can be reduced. Moreover, it is easy to shorten the power transmission pathway from the power reception coil 51 to the driving device 61 through the converter 56a and the inverter 56b. For this reason, the power transmission loss can be reduced, and it is easier to utilize the space inside the wheel 3 effectively.

The present disclosure has been described on the basis of the drawings and embodiments, but it should be noted that a person skilled in the art could make various modifications and revisions on the basis of the present disclosure. Consequently, it should be appreciated that any such modifications or revisions are included in the scope of the present disclosure. For example, the components, functions, and the like included in each embodiment or practical example may be rearranged in logically non-contradictory ways. Moreover, the components, functions, and the like included in each embodiment can be used in combination with another embodiment or practical example, and a plurality of components, functions, and the like may be combined into one, divided, or partially omitted.

For example, in the embodiments described above, some or all of the functions or processes described as functions or processes of the control device 7 may also be achieved as functions or processes of the power reception device 5 or the onboard device 6. For example, a program stating processing content for achieving each function of the control device 7 according to an embodiment may be stored in a memory or the like provided in the power reception device 5 or the onboard device 6, and the program may be read out and executed by a processor or the like of the power reception device 5 or the onboard device 6.

As another example, in the embodiments described above, the coil surface of the power reception device 5 is described as being disposed approximately parallel to the contact patch of the wheel 3, but is not limited thereto. The coil surface of the power reception coil 51 may also be disposed at any angle from 0 degrees to 90 degrees with respect to the contact patch of the wheel 3. The angle between the coil surface of the power reception coil 51 and the contact patch of the wheel 3 may be freely determined according to the purpose of the power reception device 5, the amount of power to be received, and the like.

As another example, in the embodiments described above, the tire 31 is described as being filled with air, but is not limited thereto. For example, the tire 31 may be filled with a gas such as nitrogen. As another example, instead of or in addition to air, the tire 31 may be filled with any fluid, such as a liquid, a gelatinous material, or particulate matter.

REFERENCE SIGNS LIST

1 wireless power reception system
2 moving body
21 hub
22 shaft
3 wheel
31 tire
311 bead portion
312 sidewall portion
313 tread portion
32 wheel
321 rim portion
322 disc portion
4 power transmission device
41 power transmission coil
5 power reception device
51 power reception coil
52a first spiral coil layer
52b second spiral coil layer
56a converter
56b inverter
6 onboard device
61 driving device
62 power storage device
7 control device
71 control unit
72 storage unit
73 communication unit
74 output unit
75 input unit

The invention claimed is:

1. A wireless power reception system comprising:
a power reception device including a power reception coil configured to receive power supplied wirelessly from a power transmission coil of a power transmission device installed in a road surface, at least a portion of the power reception coil being housed in a wheel of a moving body; and
an onboard device installed in the moving body, the onboard device being electrically connected to the power reception device, wherein
the power reception device is configured to transmit the received power to the onboard device,
the power reception device comprises a coil plane surrounded by the power reception coil which is looped, and
the coil plane has a convex shape pointing downward in a side view as seen from an axial direction of the wheel.

2. The wireless power reception system according to claim 1, wherein the power reception coil is curved into an arc shape in the side view.

3. The wireless power reception system according to claim 2, wherein a center of curvature of the power reception coil in the side view is located on a central axis of the wheel.

4. The wireless power reception system according to claim 1, wherein the power reception coil includes a stacked plurality of spiral coil layers.

5. A moving body comprising:

a wheel;

a power reception device including a power reception coil configured to receive power supplied wirelessly from a power transmission coil of a power transmission device installed in a road surface, at least a portion of the power reception coil being housed in the wheel; and an onboard device electrically connected to the power reception device, wherein the power reception device is configured to transmit the received power to the onboard device, the power reception device comprises a coil plane surrounded by the power reception coil which is looped, and the coil plane has a convex shape pointing downward in a side view as seen from an axial direction of the wheel.

6. A wheel of a moving body comprising:

a power reception device including a power reception coil configured to receive power supplied wirelessly from a power transmission coil of a power transmission device installed in a road surface, wherein at least a portion of the power reception coil is housed internally, the power reception device comprises a coil plane surrounded by the power reception coil which is looped, and the coil plane has a convex shape pointing downward in a side view as seen from an axial direction of the wheel.

7. The wireless power reception system according to claim 2, wherein the power reception coil includes a stacked plurality of spiral coil layers.

8. The wireless power reception system according to claim 3, wherein the power reception coil includes a stacked plurality of spiral coil layers.

9. The wireless power reception system according to claim 1, wherein the onboard device includes a driving device that drives the wheel with the received power.

10. The wireless power reception system according to claim 1, wherein the power reception coil is housed in the wheel so as not to rotate together with the wheel.

* * * * *